(12) United States Patent
Lawrence, Jr. et al.

(10) Patent No.: US 11,977,391 B1
(45) Date of Patent: May 7, 2024

(54) ROBOT NAVIGATION WITH OBSTACLE DETECTION USING A DISTANCE MEASURING SENSOR

(71) Applicant: Jack George Lawrence, Jr., Blaine, WA (US)

(72) Inventors: Jack George Lawrence, Jr., Blaine, WA (US); Jack George Lawrence, III, Boise, ID (US)

( * ) Notice: Subject to any disclaimer, the term of this patent is extended or adjusted under 35 U.S.C. 154(b) by 0 days.

(21) Appl. No.: 18/301,112

(22) Filed: Apr. 14, 2023

(51) Int. Cl.
*G05D 1/02* (2020.01)
*G05D 1/00* (2006.01)

(52) U.S. Cl.
CPC ......... *G05D 1/0244* (2013.01); *G05D 1/0238* (2013.01); *G05D 2201/0207* (2013.01)

(58) Field of Classification Search
CPC ............... G05D 1/0244; G05D 1/0238; G05D 2201/0207
See application file for complete search history.

(56) References Cited

U.S. PATENT DOCUMENTS

| | | | | |
|---|---|---|---|---|
| 4,846,297 A * | 7/1989 | Field | ................... | G05D 1/0238 701/25 |
| 5,020,620 A * | 6/1991 | Field | ................... | G05D 1/0244 250/221 |
| 5,426,584 A * | 6/1995 | Kamimura | ........... | G01C 15/002 356/152.3 |
| 5,995,884 A * | 11/1999 | Allen | ................... | G05D 1/0238 701/25 |
| 6,012,003 A * | 1/2000 | Åstrom | ................ | G05D 1/0236 701/28 |
| 6,246,930 B1 * | 6/2001 | Hori | ..................... | G05D 1/0236 340/901 |
| 6,308,118 B1 * | 10/2001 | Holmquist | .............. | G01S 17/74 318/587 |
| 6,459,955 B1 * | 10/2002 | Bartsch | ................. | A47L 9/0009 318/587 |
| 6,556,598 B1 * | 4/2003 | Angott | ................. | G05D 1/0236 372/9 |
| 2013/0325210 A1 * | 12/2013 | Palm | ...................... | G08G 1/164 701/2 |
| 2016/0026185 A1 * | 1/2016 | Smith | .................. | G05D 1/0231 356/614 |
| 2017/0017238 A1 * | 1/2017 | Tojima | .................... | E21C 41/26 |
| 2018/0190016 A1 * | 7/2018 | Yang | ...................... | G01C 11/30 |
| 2019/0154439 A1 * | 5/2019 | Binder | .................. | G01B 11/26 |
| 2020/0209397 A1 * | 7/2020 | Safstrom | ................. | G01S 17/87 |

FOREIGN PATENT DOCUMENTS

WO WO-2008017486 A1 * 2/2008 ........... A01D 34/008

\* cited by examiner

*Primary Examiner* — Donald J Wallace

(57) ABSTRACT

Within an indoor setting and upon a floor-based mobile platform, exists one servomotor-controlled IR distance measuring sensor, while some distance away exists a passive and fixed reflector. The IR sensor operates to acquire and track the fixed reflector, the relative bearing of such defining navigation by a single reference point with obstacle detection.

1 Claim, 5 Drawing Sheets

OFFSET WWR

DIRECT WRR

TAN a = OPPOSITE / ADJACENT a = INVERSE TAN (OPP / ADJ)

a = RADIANS a X 57.296 = DEGREES

90 - a = b b = DESIRED RELATIVE BEARING FOR ROBOT TO REMAIN ON PATHWAY CENTERLINE.

DESIRED RELATIVE BEARING TRIGONOMETRY CALCULATIONS FOR AN OFFSET WRR

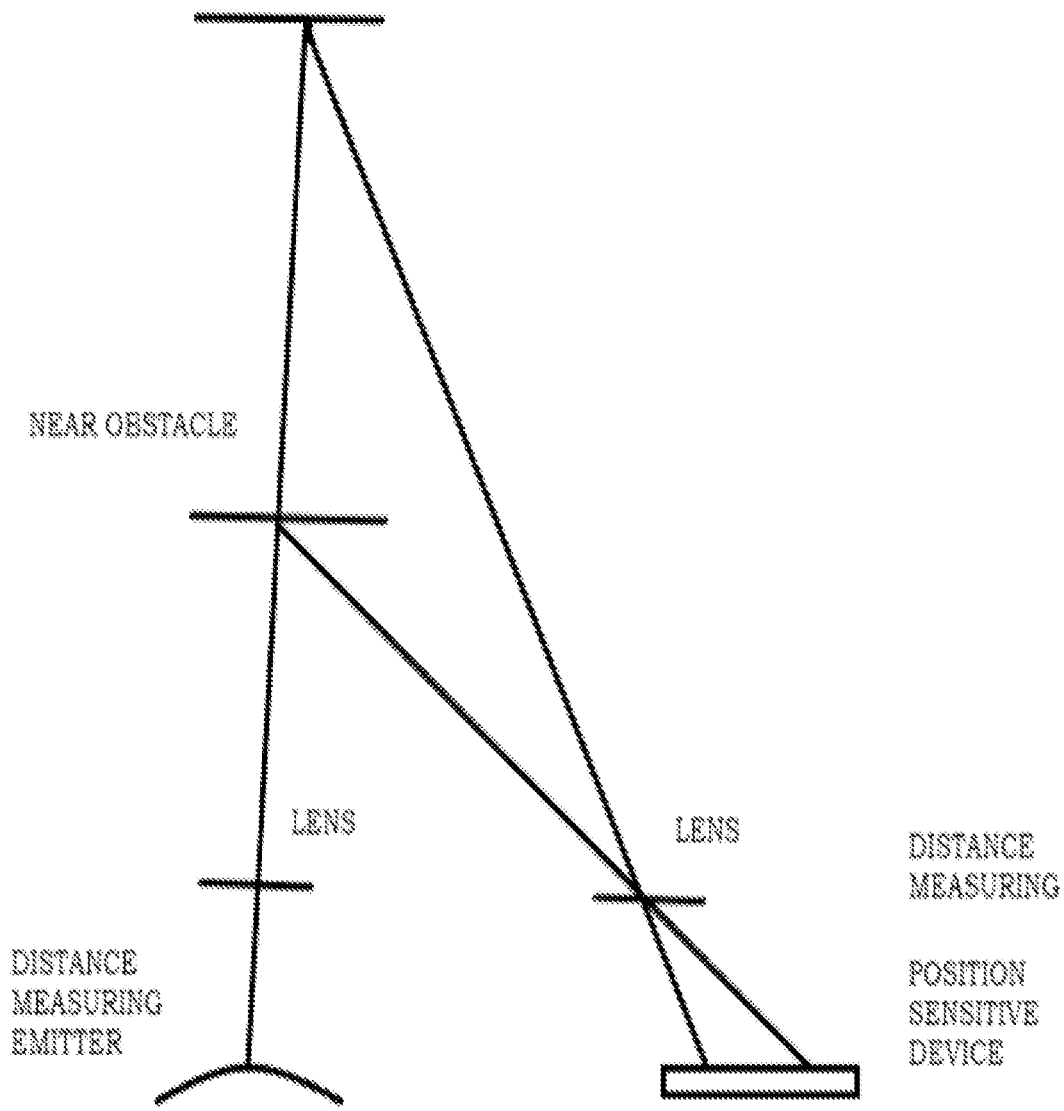

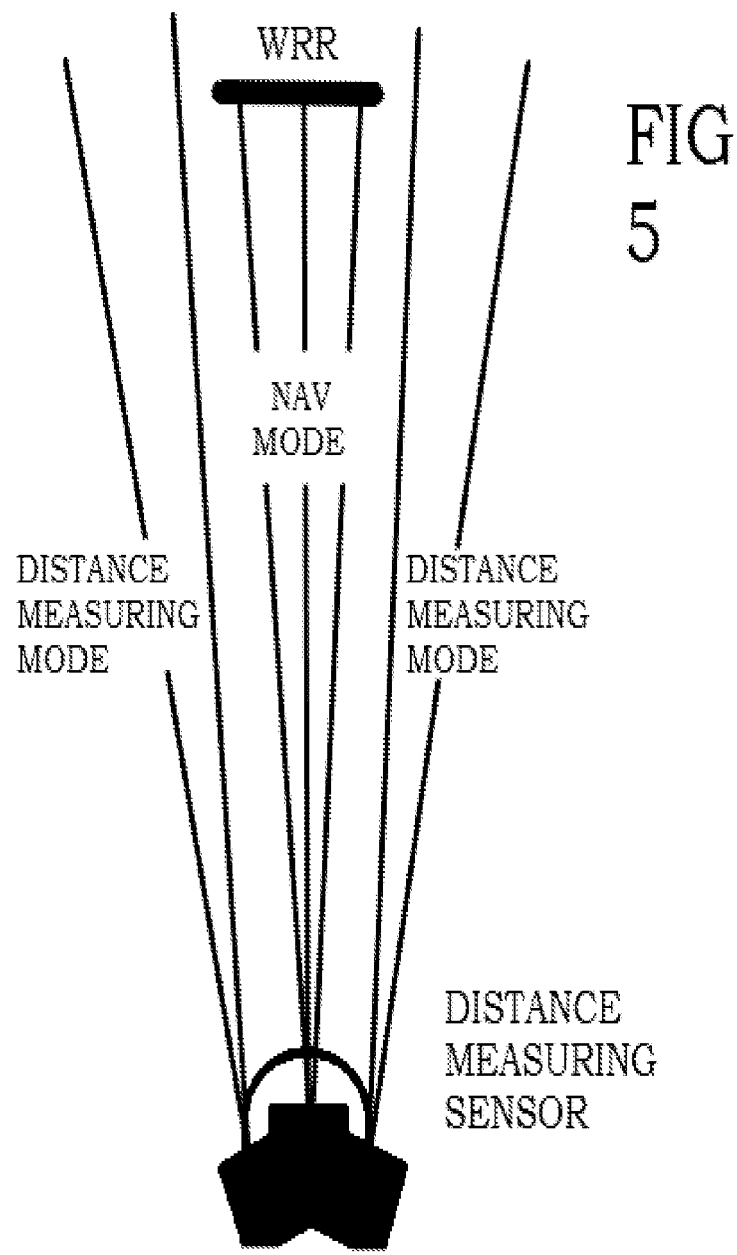

ROBOT NAVIGATION WITH OBSTACLE DETECTION USING A DISTANCE MEASURING SENSOR

GLOSSARY OF TERMS

Walkway: The natural areas used by a person to traverse a space.

Pathway: The area a mobile platform uses to navigate a Walkway. Understood to be the center of said Walkway.

Directed Light: The light emitted from a distance measuring sensor. It may comprise visible, invisible, LED, or Laser light.

Distance Measuring Sensor: A sensor which emits and receives light using the Triangulation Method for distance calculation. The sensor may contain both the emitter and receiver in one unit or be separate units which operate as a pair. It is commonly used in robotics to detect obstacles and is the basis for this invention as a method of navigation by single reference point with obstacle detection.

Triangulation Method of Distance Calculation: Emitted light is reflected off an object and returns to the distance measuring sensor at an angle which varies with distance. This reflected light strikes a Position Sensitive Device (PSD), which calculates a distance to the object. See FIG. 4. This method is not a time-of-flight measurement.

Waypoint Reference Reflector (WRR): The single, fixed, point on a walkway that determines the Relative Bearing to the centerline of the intended Pathway.

Predetermined Course Navigation: A route that is chosen ahead of time. Navigation through an area would take one of several preselected routes.

Navigation by Multiple Reference Point: Navigation where the robot position is determined from more than one Relative Bearing Source.

Navigation by Single Reference Point: Navigation where the robot position is determined from only one Relative Bearing Source.

Yaw Axis: An axis considered to be a 360-degree plane parallel to the floor.

Actual Bearing: The current relative bearing between the longitudinal axis of the mobile platform (along which the servomotor controlled-distance measuring sensor is aligned) and the Waypoint Reference Reflector.

Desired Bearing: The intended relative bearing between the longitudinal axis of the mobile platform (along which the servomotor-controlled distance measuring sensor is aligned) and the Waypoint Reference Reflector. This Bearing must be acquired for the mobile platform to remain on the pathway centerline.

Servomotor Gear Lash: Hobby grade servomotors can be affected by gear lash. It is the noticeable physical position difference of a particular degree that was arrived at from different directions. Example, move left to 70 degrees, note the physical position, move further left 10 more degrees and then move right to 70 degrees, and note the physical position. Most likely the actual position will differ, perhaps as much as 3 degrees. Looser manufacturing tolerances are most likely the cause. A preferred embodiment of this invention has drastically reduced this error by employing a unique tracking strategy.

BACKGROUND OF THE INVENTION

Robot navigation through an indoor space represents a unique challenge. Some prior art solutions to this problem have focused upon increasing the accuracy of robot positioning by using active beacons. Still other solutions have focused upon the robot creating a detailed area map. Prior art has moved in the direction of greater complexity and bringing with it greater cost. I propose a pause in pursuing a solution, until the actual requirements of navigation in an area are understood. What kind of area is available for navigation? What are the obstructions likely to be encountered? Is the robot expected to navigate an area using previous routes, or will each excursion through an area be unique? By moving toward simpler solutions, whenever possible, the result will be greater reliability and decreased cost.

The objective of this invention is to provide options for predetermined course navigation that may be a better fit than prior art solutions. Instead of an active beacon, I propose a passive beacon, a simple reflector. Instead of mapping the environment, why not just focus on what is in the pathway of the robot. Why not merge navigation with obstacle detection? Let's consider a solution using directed light.

Directed Light Navigation by Multiple Reference Point

This navigation assures accurate positioning of the robot, and results in the most precise navigation possible. The robot's position is derived from multiple bearings, allowing it to pinpoint its exact position. These bearings, from multiple directions, are relative bearings between the robot and a source, the source being navigation beacons or detected obstacles. With this information the robot can plot a path based upon its surroundings. This accuracy comes with increased complexity and cost.

Directed Light Navigation by A Single Reference Point

The robot's position is derived from a single relative bearing to one source. Navigation is achieved by maintaining a desired relative bearing to this source. This navigation, while less accurate, can provide the fidelity required for many areas. Line of sight contact with the single source must be maintained. This accuracy comes with decreased complexity and cost.

Rethinking Navigation Requirements

Consider a large Livingroom with numerous furniture pieces placed within. This landscape is filled with lots of chair legs and table legs to contend with. A robot is tasked with traversing this room from one side to the other. A robot employing navigation with multiple reference points could negotiate this space quite successfully. A LIDAR mapping robot is one such example. While impressive, this level of navigation accuracy, along with its costs and complexity may be unnecessary. If the area to be navigated could be redefined by narrowing its scope, then the accuracy required for navigation could be reduced. Now reconsider the same large Livingroom with the same numerous furniture pieces placed within. Again, a robot is tasked with traversing from one side to the other.

Only this time, consider the natural walkways that such a room has. I propose redefining the space through a room by identifying natural walkways. That which lies beyond the walkway borders should be regarded as clutter, unimportant to the task of navigation through the room. Consider how a person views the room. A person looks for walkways to reach their destination and does not consider the obstacles in the middle of the room, or the floor space between pieces of furniture. Likewise, a robot could approach navigation similarly, and navigate via walkways to the destination. By redefining the movement space, and ignoring all else, navigation requirements are simplified dramatically. In this instance, negotiating walkways are completely within the capabilities of navigation using a single reference point.

Brief Summary of the Invention

My inventive concept: A distance measuring sensor, which directs light to a fixed reflector, the relative bearing of such is the basis for navigation by a single reference point with obstacle detection.

All navigation solutions require obstacle detection capabilities. Applications employing multiple reference point navigation often capitalize on their technical qualities to incorporate obstacle detection. However, applications using single reference point navigation typically must add obstacle sensors, increasing their cost and complexity. This ultimately detracts from the benefits of employing such a simple solution to navigation. My inventive concept demonstrates navigation by a single reference point using a distance measuring sensor designed for obstacle detection. Instead of adding complexity, a more elegant solution emerges. I propose using a sole distance measuring sensor for both navigation and obstacle detection, thereby increasing efficiency while decreasing cost and complexity.

The Distance Measuring Sensor Technical Overview

Distance Measuring Mode

The distance measuring sensor calculates distance to an object via the Triangulation Method of the emitted light. When light is reflected off an object, the position of the returning light on the CCD imager changes with respect to distance. The CCD imager is a Position Sensitive Device which measures this angle change of reflected light. The sensor's output voltage and calculated distance is a result of the point of contact of the reflected light. I will refer to this mode of operation as the Distance Measuring Mode. See FIG. 4.

Navigation using a distance measuring sensor is accomplished by exploiting the Position Sensitive Device of the CCD imager with the returning light from a reflector, thereby preventing distance measuring calculations and placing the sensor into the Navigation Mode.

Navigation Mode

My inventive concept uses the distance measuring sensor to acquire and track a fixed reflector at floor level. The returning light from a reflector saturates the CCD sensor, preventing distance calculations, and places the sensor in the Navigation Mode. In this mode, the robot's position is determined by measuring the relative bearing to this reflector. The bearing data is repeatedly updated, resulting in straight line navigation along the pathway centerline. As a servomotor sweeps the distance measuring sensor left to right, tracking the reflector, the distance measuring sensor switches between Navigation Mode and Distance Measuring Mode. When the reflector light is received, the distance measuring sensor operates in Navigation Mode and produces a relative bearing to the reflector. When the reflector light is disrupted, the distance measuring sensor reverts to Distance Measuring Mode, hence performing two critical functions, navigation, and object detection. Simple, effective, and inexpensive.

BRIEF DESCRIPTION OF THE DRAWINGS

FIG. 4. Distance Measuring Sensor theory of operation for calculating distance using the Method of Triangulation.

FIG 5. Scanning sequence of the distance measuring sensor upon the WRR.

DETAILED DESCRIPTION OF THE INVENTION AND PREFERRED EMBODIMENT

Figure 1:
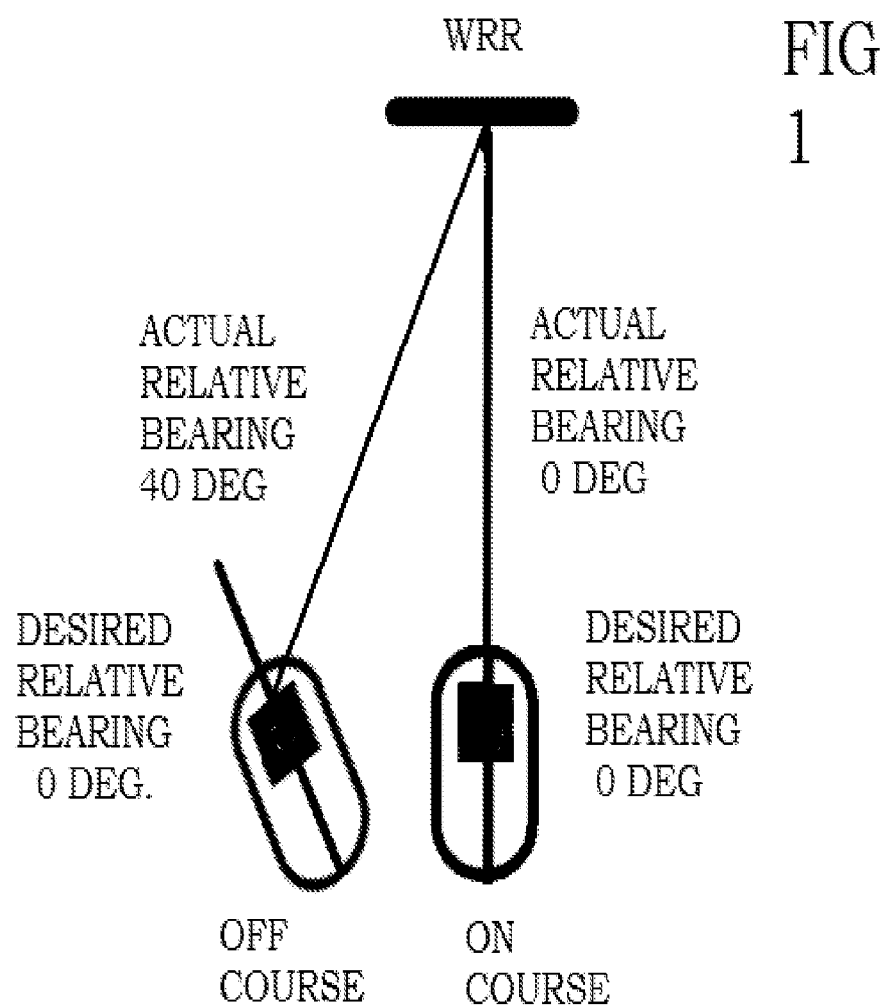
FIG. 1. Robot proceeding direct in relation to a WRR. The Desired Bearing remains at 0 degrees from robot center to track pathway centerline.

1. The Waypoint Reference Reflector (WRR). This is a passive reflective material that reflects the incoming light pulse from the robot.

2. The Mobile Platform (Robot). This mobile platform contains the means for locomotion, the control circuits for such, the IR distance measurement sensor, the servomotor to orient such, and the microcontroller running the necessary code to direct navigation. A single lithium-ion rechargeable battery provides the power.

Waypoint Reference Reflector (WRR)

An IR distance measuring sensor on the robot directs a light pulse in search of the pathway WRR. This reflector simply provides adequate return illumination to the distance measuring sensor on the robot. While most reflective material will suffice, including glass, plastic, or metal, I have used reflective "safety tape" quite successfully. Various sizes and shapes can be used, if the return illumination is of sufficient quality being received by the IR distance measuring sensor on the robot. The longer the distance to be covered, the more reflector surface area is required. For reflective tape a strip 2 in×5 in proves suitable for distance runs of 25 ft. Reflector sizes can be adjusted up or down as necessary. The WRR is positioned vertically at floor height. Locations such as a baseboard, a table leg, or a doorsill are usable so long as the effective height is the same as the IR distance measuring sensor on the robot. As the robot travels forward, it uses the WRR as a reference to remain in the center of the desired pathway until it stops at the desired endpoint. The WRR location must always be in a visible line of sight position but need not be located on the pathway centerline. An offset position of the WRR works very well allowing the robot to travel along the pathway center. WRR's are deployed on walkways as necessary to provide a reference that the robot travels toward. Each walkway typically uses one WRR, however, a WRR may be shared from one walkway to another.

The Mobile Platform (Robot)

The essence of the robot is a mobile platform with a servomotor mounted IR distance measuring sensor that acquires and tracks the WRR. A servomotor pans the yaw axis (parallel with floor) to determine the WRR location left to right. Angle information to enable the IR distance measuring sensor's tracking is provided by the servomotor. A microcontroller controls the IR distance measuring sensor, the servomotor, and produces pulse width modulation to the robot motors to maintain directional control along the pathway centerline.

This embodiment uses a Sharp Corporation IR distance measuring sensor GP2Y0A02YK0F. It produces an analog output, is easily paired with a microcontroller, and comes as a single unit. Normal operating range is 20-150 cm. The CCD image sensor is designed to detect light reflections from physical objects using the method of triangulation. The distance to a physical object affects the point where the returning light strikes the CCD imager. Objects at 20 cm output 1.8v and objects at 150 cm output 2.3v. In this embodiment, the characteristics of the CCD imager are exploited by using the WRR instead of a physical object. When an IR pulse strikes the WRR, the reflected light saturates the CCD imager and outputs 0v. This condition is easily read with the microcontroller and becomes the basis for this inventive concept. The reflection from the WRR essentially disables the normal processing of the CCD imager and prevents any analog indication of distance. Instead of being limited to about 5 ft (150 cm), the WRR can be detected at distances exceeding 30 ft. The limiting factor becomes the size and quality of the WRR.

Important to note that using a GP2Y0A02YK0F sensor for navigation in this manner also provides obstacle detection. The Actual Bearing to the WRR is known to be free of obstructions because of the 0v output from the IR distance measuring sensor. If the reflected light from the WRR is lost, the bias voltage at the IR distance measuring sensor will rise. As the servomotor moves the IR distance measuring sensor (5 deg) left and right, it continually sends out pulses. When the pulses fail to return from the WRR, a higher voltage is biased at the IR distance measuring sensor. If an obstruction should appear (within the range of 20-150 cm) it will be detected.

Navigation Strategy

The strategy employed is twofold. First the WRR must be acquired and tracked by the IR distance measuring sensor. Its angle information is determined by the servomotor position. This angle is referred to as the Actual Bearing of the robot to the WRR.

Secondly, A Desired Bearing must be established and compared to the Actual Bearing. If the WRR is positioned on the pathway centerline, then the Desired Bearing to the WRR will be directly ahead of the robot centerline. The Desired Bearing will never change and remain at 0 degrees. See FIG. 1.

As the robot drifts from the pathway centerline, the Actual Bearing will change to the left or right of 0 degrees. At this point, PWM signals are sent to the robot motors to steer the vehicle proportionally from its error state to a state where the Actual Bearing equals the Desired Bearing. In this embodiment the Actual Bearing to Desired Bearing comparison cycle takes place once for every 2-3 in of robot travel forward.

Figure 2:
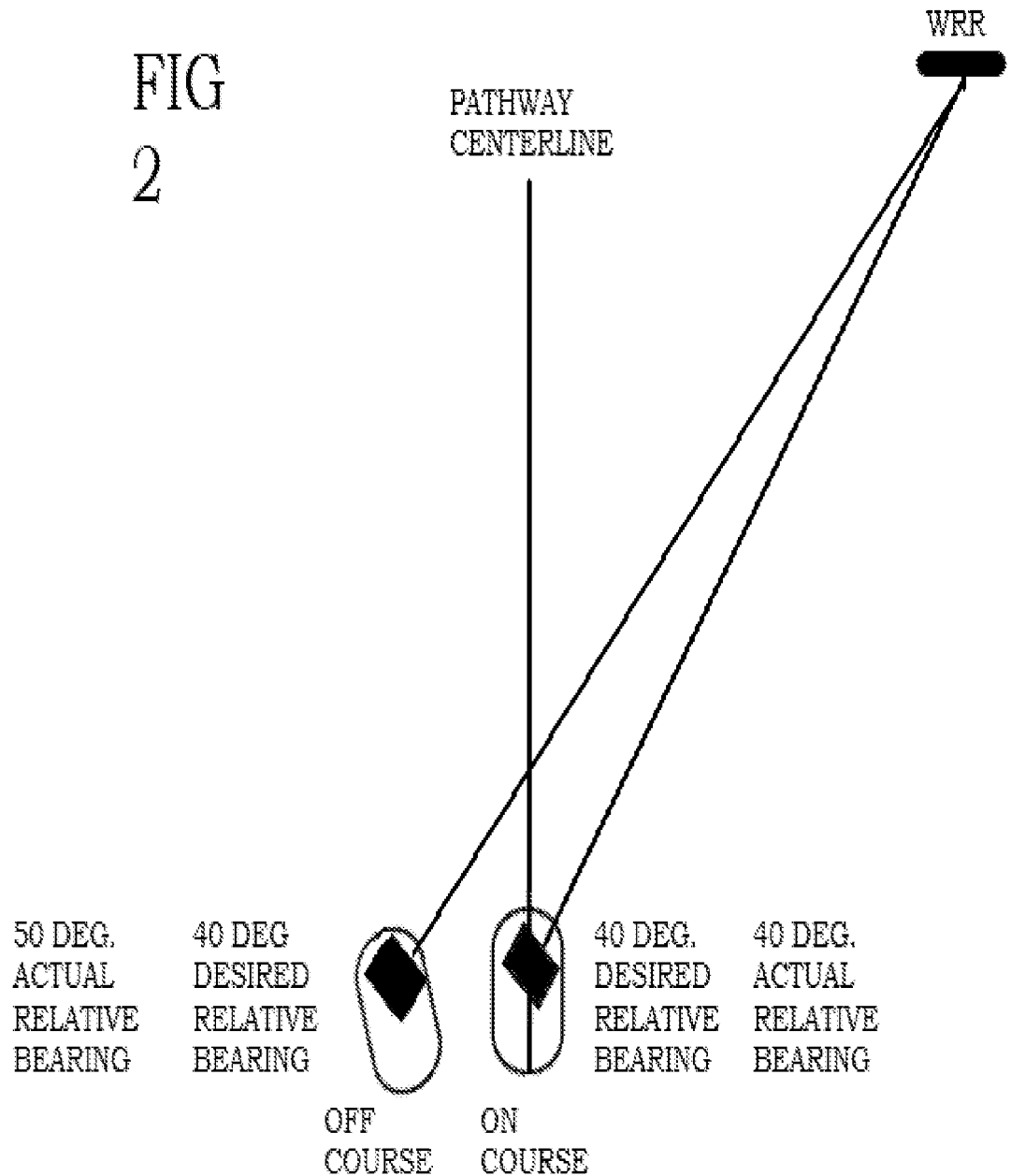
FIG. 2. Robot proceeding offset in relation to a WRR. The Desired Bearing is ever changing to allow the robot to track the pathway centerline.
Figure 3:
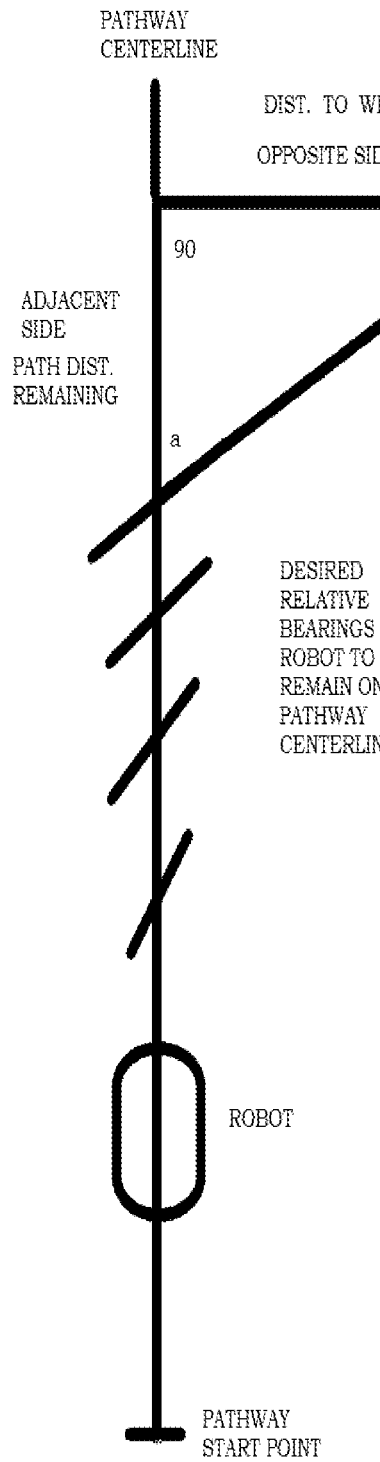
FIG. 3. Trigonometry calculations to determine an ever-changing Desired Bearing with an offset WRR.

Now consider a case in which the WRR is not affixed to an object (wall) that coincides with the pathway centerline. Say you desire the robot to travel down a long hallway and the robot needs to turn into the second doorway way on the right. If a sufficient sized WRR were positioned at the end of the hallway it could be affixed at the pathway centerline. But you wish to use a smaller WRR and affix it to a doorsill the robot will enter through. The WRR is now offset from the centerline and for the robot to travel along the pathway centerline, the Desired Bearing must be computed continuously from the pathway start point to the pathway endpoint. Trigonometry using the inverse tangent function of a right triangle is employed to produce the Desired Bearings. See FIG. 3. This computation is continuously computed and compared with the Actual Bearing to the WRR. By steering the robot proportionally left or right the Actual Bearing will coincide closely with the Desired Bearing. See FIG. 2.

A factor important to robot navigation is distance measurement. When moving towards a WRR, distance traveled is one of the methods for identifying the pathway endpoint. Distance measurement is also important when performing the trigonometry calculations required with an offset WRR, as Desired Bearings are constantly changing for pathway centerline alignment. With all these calculations requiring a distance factor, quite a challenge exists since reliable surfaces are not always present for such measurements. Wheel rotation counting is a potential solution despite the error due to traction slippage. Unfortunately, wheel rotation counting places heavy computing demands upon the microcontroller. Hence, many robots that use this distance measuring strategy employ a separate microcontroller dedicated to this task alone. It is the author's opinion, that in this case, the anticipated benefit does not overcome the additional complexities of this strategy.

An alternative to measuring distance is measuring time. This embodiment employs a Timer Circuit with a resolution of 100 ms steps. The demonstrated error rate is about 3-4% of the actual distance traveled. During testing, for every 10 ft of travel the largest error in marking this distance was 3-4 inches. This level of accuracy satisfies even the most critical demand, that of the trigonometry calculations needed for an offset WRR, additionally the timer computing demands on the microcontroller are minimal.

Several options for identifying the pathway endpoint exist. They are a Timer Circuit value, a Desired Bearing value, an Actual Bearing value, or a higher value voltage from the distance measuring sensor (object detected).

Step by Step Process of the Preferred Embodiment

System powerup and global variables set.

Individual pathways listed along with their specific variables such as Distance/Timer Endpoint, Desired Bearing at the Pathway Start point and Endpoint, and whether the WRR is centered or offset from the pathway centerline.

Robot acquisition of WRR and comparing the Actual Bearing with the Desired Bearing and pivoting the robot to within 10 degrees of the Desired Bearing.

The following scripts run concurrently, producing global variables that each script needs in real time.
1. Timer Script. Activated with motors and continuously updates elapsed time. Stops robot at the Endpoint.
2. Desired Bearing Script. For a WRR on the pathway centerline the default Desired Bearing is 0 degrees. For an offset WRR, continuous trigonometry calculations produce an updated Desired Bearing.
3. Run Script. This is the WRR tracking script that produces the Actual Bearing.
4. Motor Driver Script. This script compares the Actual Bearing with the Desired Bearing and applies proportional PWM signals to the robot motors.

Run Script WRR Tracking Sequence

The following describes the action of the servomotor-controlled distance measuring sensor scanning sequence.

The light beam characteristics require probing the width of the beam to determine the light beam centroid. At the pathway start point the light beam width may be 2 degrees, while at the pathway endpoint the light beam width may be 8 degrees. This phenomenon exists, because as a percentage of the robot's field of view, the WRR is increasing as it moves towards the pathway endpoint.

The distance measuring sensor is pulsed, and if the WRR returning light is of sufficient quality the robot drive motors begin. The servomotor moves 1 degree Right, the distance measuring sensor is pulsed and if the WRR remains in alignment, the servomotor moves 2 degrees Left. Again, the sensor is pulsed and if the WRR remains in alignment the servomotor moves 3 degrees Right. This sequence continues until after a sensor pulse, insufficient WRR light is returned, and a WRR misalignment is detected. A search scan is initiated, moving the servomotor in the opposite direction of the misalignment. The sensor is pulsed at 1 degree servomotor intervals until sufficient light is returned to the sensor indicating alignment with the WRR.

After each Sensor pulse with sufficient WRR light returned, an Actual Bearing is calculated upon the known centroid of the light beam. Continually probing the edges of the light beam in this manner benefits in 4 ways.
1. The Actual Bearing is identified accurately as the beam centroid.
2. Once alignment with the WRR is lost, the Distance Measuring Mode begins. If an obstacle appears within its design range of 20-150 cm it will be detected.
3. Locating the WRR again is easily done by reversing servo movement.
4. The effects of servomotor gear lash are minimized by continually reversing direction in ever increasing degrees of travel. Servomotor gear lash in hobby grade components has led to large errors (3 deg) between right and left searches using other strategies. This search strategy allows for inexpensive servomotors that coincides with the objectives of simple, efficient, and inexpensive.

Figures

1. Robot proceeding direct in relation to a WRR. The Desired Bearing remains at 0 degrees from robot center to track pathway centerline.

2. Robot proceeding offset in relation to a WRR. The Desired Bearing is ever changing to allow the robot to track the pathway centerline.
3. Trigonometry calculations to determine an ever-changing Desired Bearing with an offset WRR.
4. Distance Measuring Sensor theory of operation for calculating distance using the Method of Triangulation.
5. Scanning sequence of the distance measuring sensor upon the WRR.

The invention claimed is:
1. A method for mobile platform navigation, comprising:
providing a single reference point reflector in an operating environment;
providing a mobile platform including a controller ; a distance measuring sensor operably communicating with the controller and rotatably mounted to the mobile platform by a rotation mechanism,
  wherein the sensor has an orientation relative to a longitudinal axis of the mobile platform determined by the rotation mechanism,
  wherein the distance measuring sensor is configured to perform a distance measuring function using a triangulation method, whereby light emitted by the sensor is reflected from a target object in the operating environment and received by the sensor at an angle and brightness determining a distance to the target object,
  wherein the sensor is configured to interpret light having a brightness above a predetermined threshold as being reflected by the single reference point, and
  wherein upon detecting the single reference point, terminating the distance measuring function relative to the single reference point;
calculating, incrementally, the azimuth of the single reference point relative to the longitudinal axis of the mobile platform ; to determine a position of the mobile platform relative to a navigable course;
calculating, using the azimuth of the single reference point, a position of the mobile platform and a course for navigating the mobile platform to a destination; and
directing, by the controller, a means of locomotion of the mobile platform to navigate to the destination.

* * * * *